(No Model.)
W. H. ECKERT & J. A. SEELY.
TELEPHONIC CIRCUIT.
No. 282,867. Patented Aug. 7, 1883.
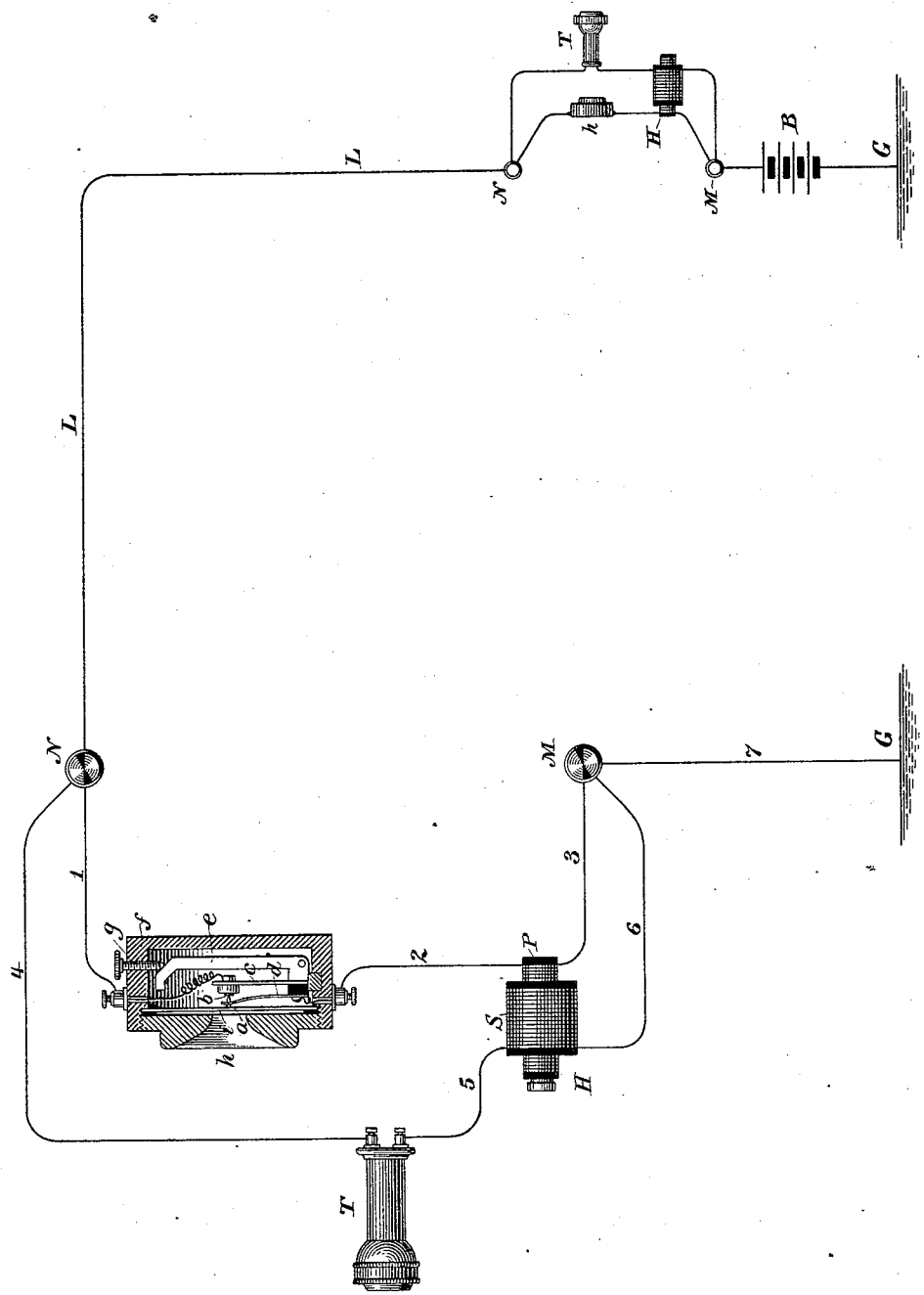
WITNESSES
Wm. A. Skinkle.
Geo. W. Breck.
INVENTORS
Wm. H. Eckert
John A. Seely
By their Attorney
C. L. Buckingham

UNITED STATES PATENT OFFICE.

WILLIAM H. ECKERT AND JOHN A. SEELY, OF NEW YORK, N. Y.

TELEPHONIC CIRCUIT.

SPECIFICATION forming part of Letters Patent No. 282,867, dated August 7, 1883.

Application filed February 26, 1883. (No model.)

*To all whom it may concern:*

Be it known that we, WILLIAM H. ECKERT and JOHN A. SEELY, citizens of the United States, and residing in the city, county, and State of New York, jointly have invented certain new and useful Improvements relating to Telephonic Circuits, of which the following is a specification.

In connection with the ordinary battery or contact-transmitter a local battery is commonly employed at each subscriber's station, and said battery and contact-transmitter are placed in the primary circuit of the associated induction-coil, whereby, as the transmitter is subjected to sound-vibrations, the current in the primary circuit is rendered pulsatory or variable in strength, whereupon electrical undulations are set up in the secondary circuit of the inductorium.

The object of our invention is to dispense with local batteries at subscribers' stations, though still employing the ordinary contact-transmitter in the primary circuit of an inductorium. To this end we locate the battery necessary to effect transmission normally in the main line at the central station, and at the subscriber's station the main line is divided into two multiple-arc branches, in one of which is placed the transmitter and primary coil of the inductorium, and in the second branch the secondary coil of said inductorium, and, in addition, if desired, a receiving-telephone.

We will now describe our invention by reference to the accompanying drawing.

B is a main-line battery located at a central office remotely situated, in respect to the subscriber's station, upon line L, grounded both at the central and subscribers' stations. At points M N of the main line it is divided into two multiple-arc branches, 1 2 3 and 4 5 6, and in the first of said branches is placed any ordinary form of contact-transmitter and the primary coil P of an inductorium, H, while in the second branch are placed the secondary coils of the inductorium, either with or without a receiving-telephone, T.

The transmitter consists of a mouth-piece, *h*, a diaphragm, *i*, an electrode, *b*, normally held in contact with the diaphragm, and supported upon a fragile spring, *d*, an adjusting-arm, *e*, having a set-screw, *g*, mounted in case *f*, and a comparatively rigid spring, *c*, weighted at its free end, and carrying a second electrode, *a*, with which electrode *b* makes vibrating contact in the process of transmitting sound. Wires 1 and 2, respectively, are connected to springs *c* and *d*.

It is obvious that the main line may be divided into two branches at any point along its length, in which may be placed a telephonic transmitter and receiver, as above described, and that a telephonic transmitter and receiver may likewise be arranged upon the main line at the central station near the main battery.

The operation of our invention in the transmission of speech from a subscriber's station to the central office is as follows: Normally a current upon the main line from battery B divides at post N, part flowing through the transmitting and primary coil of the inductorium and part through the secondary of the inductorium and the receiving-telephone to post M, and thence to earth through wire 7. Upon speaking into the transmitting-telephone, and thereby in turn causing a vibration of electrodes *a b*, the current through branch 1 2 3 is rendered undulatory. Each tendency, therefore, toward an approach or recession of electrodes *a b* in respect to each other causes a variation of current strength in the primary of the inductorium. Variations of current strength in the primary coil cause corresponding impulses to be set up in the secondary of the inductorium, and these impulses, though partially short-circuited in branch 1 2 3, pass over line L to a distant station in sufficient strength to effect the reproduction of speech in a practical manner. The tension of current from battery B being very low compared with that of the induced currents, electrical pulsations set up in coil *s* alternately augment and suppress the battery-current, and thereby produce vibratory or undulatory currents practically of the same character as though no battery were on line.

What we claim, and desire to secure by Letters Patent, is—

1. The combination of a main line provided with battery, two main-line branches unprovided with battery, in one of which is placed a telephonic transmitter and one coil of an inductorium and in the other the secondary coil of the inductorium.

2. The combination of an inductorium whose primary and secondary coils form parts, respectively, of two main-line branches, said branches being unprovided with battery, a telephonic transmitter placed in one of said branches, and a main line and battery.

3. The combination of a main line provided with battery, two main-line branches unprovided with battery, in which are placed, respectively, a telephonic receiver and transmitter and an inductorium whose coils form parts of said branches, as described.

WILLIAM H. ECKERT.
JOHN A. SEELY.

Witnesses:
WM. B. VANSIZE,
WM. ARNOUX.